Jan. 28, 1958  J. R. OISHEI ET AL  2,821,382
WINDOW OPERATOR
Filed March 10, 1955
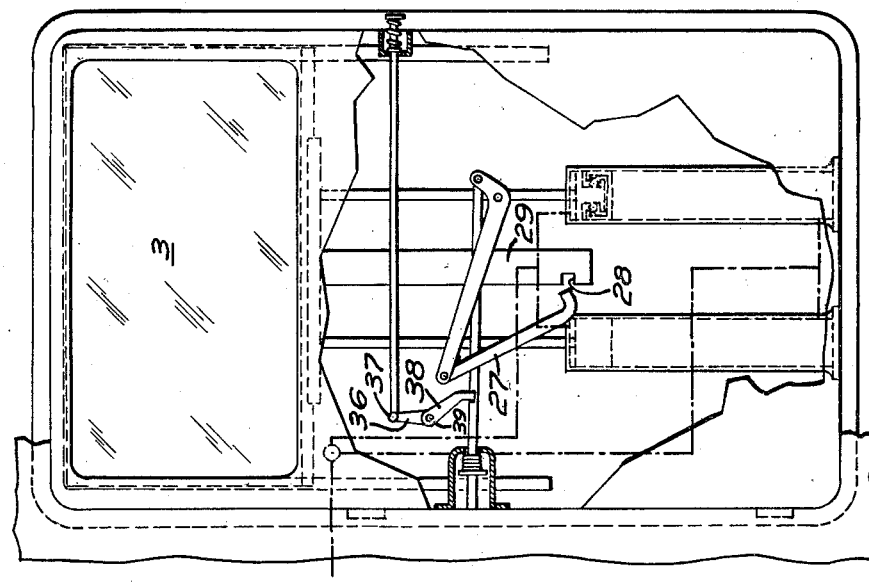
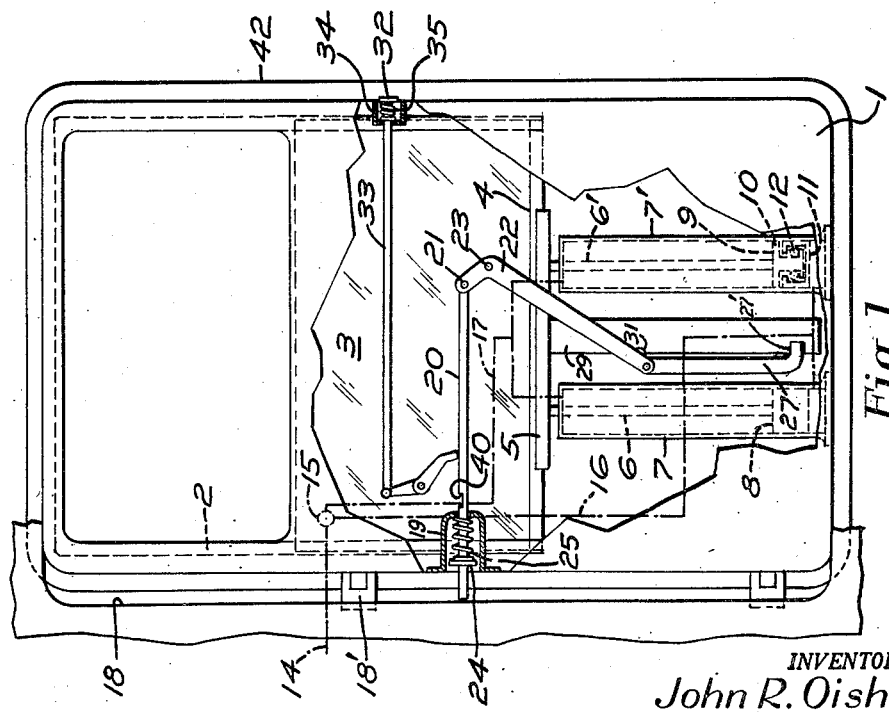
INVENTORS
John R. Oishei
and William C. Riester
BY: Beau, Brooks, Buckley & Beau,
ATTORNEYS.

United States Patent Office 2,821,382
Patented Jan. 28, 1958

2,821,382

WINDOW OPERATOR

John R. Oishei, Buffalo, and William C. Riester, Eggertsville, N. Y., assignors to Trico Products Corporation, Buffalo, N. Y.

Application March 10, 1955, Serial No. 493,444

8 Claims. (Cl. 268—125)

This invention relates generally to the window operator art, and more particularly to a new and useful means for closing a vehicle window automatically upon closing the door in which the window is mounted.

Various mechanisms have been proposed for opening and closing vehicle windows automatically upon actuating a control button, such mechanisms generally having either a fluid pressure motor or an electric motor. Automatic window operators of this type add greatly to the convenience of the vehicle occupants, and particularly the vehicle operator, in that mere actuation of the control button is all that is required to move the window in the desired direction.

However, automatic window operators utilizing fluid pressure or suction motors require that the vehicle engine be running, and those using electric motors generally require that the ignition switch be turned on, and this is a severe disadvantage under certain conditions. For example, it frequently happens that after shutting off the engine and getting out of the vehicle, the operator discovers that the window is in a lowered position. Often it is desired to have the window closed when the vehicle is parked, whereby to avoid theft of articles from the vehicle and to avoid damage to the interior of the vehicle from inclement weather, and when the vehicle is equipped with the aforesaid automatic window operators the vehicle operator must reenter the vehicle and start up the engine or at least turn on the ignition switch.

Accordingly, it is a primary object of this invention to provide a vehicle window closing mechanism adapted for use in conjunction with such automatic window operating mechanism and selectively operable to close a vehicle window automatically upon closing the door in which the window is mounted.

A window closing mechanism in accord with this invention is characterized by the provision of a window actuating mechanism operable to engage the window pane and lift it to its fully closed position automatically upon closing the vehicle door, together with selectively operable latch means normally holding the actuating mechanism inoperative.

The foregoing and other objects and advantages of a vehicle window closing mechanism in accord with this invention will become clearly apparent from the ensuing detailed description of a preferred embodiment thereof, taken together with the accompanying drawing illustrating such embodiment and wherein:

Fig. 1 is a somewhat diagrammatic view of a window closing mechanism in accord with this invention installed in a vehicle door in conjunction with an automatic window operator; and Fig. 2 is a view similar to Fig. 1 but showing the window closing mechanism in a different position of operation.

Referring now to the accompanying drawing, numeral 1 represents a vehicle door having a guide way 2 receiving the vertically slidable window pane 3. The window glass is provided along its bottom edge with a border strip 4 secured in a channeled bracket 5 which is connected to the piston rods 6 and 6' of a pair of fluid pressure operated motors 7 and 7', respectively. The motors 7 and 7', comprising part of an automatic window operator, are of a conventional type such as illustrated for example in United States Patent 2,515,712, and are secured within the door panel, the motors being interconnected for joint operation as by the bracket 5.

Motor 7 has a piston element 8 movable therein and joined to the rod 6, and motor 7' has a piston element 9 movable therein and comprising a self energizing lock or clutch constructed, for example, in accord with the teaching of the aforesaid patent. To this end, piston element 9 has a section 10 carried by rod 6' and a floating section 11, with rollers 12 between the sections, the same being constructed and arranged in a manner such that the window pane 3 can always be lifted but cannot be lowered except by the motors 7 and 7', the piston section 11 expanding against the adjacent cylinder wall to prevent lowering of the window pane either manually or because of the weight thereof.

Motors 7 and 7' can be operated by either superatmospheric or subatmospheric pressure, and in each case the motors are connected to a suitable source of fluid pressure or of suction, such as the intake manifold of the motor vehicle engine, not illustrated, by a conduit 14 extending from a control switch 15 to the source of pressure or suction, a conduit 16 extending between switch 15 and motors 7 and 7' on the corresponding side of the pistons therein and a conduit 17 extending between switch 15 and motors 7 and 7' on the other side of the pistons therein. In operation, both sides of both pistons 8 and 9 are normally exposed either to suction or to the atmosphere or to superatmospheric pressure, and when it is desired to move the window pane switch 15 is manipulated to create a pressure differential across the pistons causing operation of the motors in a known manner.

When the vehicle engine has been turned off, the above described automatic window operator is inoperative, and this invention provides a mechanism adapted for use under such circumstances for closing the window pane 3 automatically upon closing the door 1, as follows.

The door 1 is hinged in the usual manner to a hinge pillar 18 comprising a part of the vehicle body, as by the hinges 18', whereby the door may be swung open and closed. A bracket 19 is mounted interiorly of the door panel on the hinge side thereof, and a rod 20 slidably extends through said bracket.

At its inner end rod 20 is pivoted, as at 21, to one arm of a bell crank lever 22 which is pivoted, as at 23, on the door panel. Adjacent its outer end rod 20 carries a shoulder 24, and a compression spring 25 extends between shoulder 24 of rod 20 and the inner wall of bracket 19, whereby spring 25 constantly urges rod 20 to its fully extended position illustrated in Fig. 1 with the outer end of rod 20 being exposed for bearing against the hinge pillar 18.

It will be noted that bell crank 22 has a relatively short arm and a relatively long arm, to provide the desired leverage, rod 20 being connected to the relatively short arm of the bell crank. A pawl member 27 is pivoted to the outer end of the long bell crank arm and depends therefrom under the influence of gravity. On its outer end, pawl 27 is provided with a projecting part 27' adapted to engage in a recess or notch 28 formed adjacent the lower end of a post 29 extending downwardly from the bracket 5.

In operation, assuming that the parts are arranged as shown in Fig. 1 with the window pane in its fully lowered position and with rod 20 projecting to its fully extended position under the influence of spring 25, the door 1 being open, it will be noted that the part 27' of pawl member 27 engages the notch 28 of post 29. Now, when the door 1 is closed the outer end of rod 20 bears against the hinge pillar 18 and is forced inwardly by the door closing movement to its fully retracted position illustrated in Fig. 2. As rod 20 slides inwardly it pivots bell crank 22 in a clockwise direction, causing the bell crank to lift pawl member 27 upwardly and thereby lift post 29 upwardly to fully close the window pane 3, as illustrated in Fig. 2. As the window pane 3 reaches its closed position, the pawl member 27 bears against a stop 31 carried adjacent the outer end of the long arm of bell crank 22, whereby a slight continued movement of bell crank 22 forces the pawl member 27 out of engagement with the post 29.

It will be appreciated that pawl 27 engages post 29 when the pawl member is in a substantially vertical position whereby such engagement occurs naturally, and the weight of the window pane 3 and post 29 on pawl member 27 as the latter lifts upwardly on the post 29 causes these parts to remain engaged, even as the pawl 27 is swung out of vertical alinement, until the stop 31 forces the pawl projection 27' out of the notch 28.

Of course, it will not always be desired to have the window pane closed whenever the door is closed, and means are provided in accord with this invention for maintaining the aforesaid window closing mechanism inoperative except when operation thereof is desired. Such means can comprise latch means including an actuating button 32 carried at the end of a rod 33 which slides through a bracket 34 secured on the side of the door remote from the hinge. A spring 35 extends between the button 32 and the inner wall of the bracket 34 to normally urge the rod 33 to its fully extended position illustrated in Fig. 2. At its inner end, rod 33 is pivoted to one arm 36 of a crank, as at 37, the other arm 38 of the crank, which is pivoted to the door frame at 39, depending downwardly for engagement in a notch 40 formed in rod 20.

Normally, once door 1 has been closed causing rod 20 to retract, the spring 34 associated with the latch will urge rod 33 in a direction causing crank arm 38 to move into engagement with the notch 40 in the rod 20. This will lock rod 20 in its retracted position and the various parts will assume the position shown in Fig. 2 with pawl 27 being held away from post 29 for selective operation by the automatic window operator mechanism. It will be noted that the latch actuating button 32 is shielded by the flange 42 normally surrounding the vehicle door and normally shielding the usual door latch parts which are not illustrated herein. With the parts locked in the position illustrated in Fig. 2, the door can be opened and closed at will and the fluid motor can be actuated at will to adjust the position of the window pane.

However, upon for example stepping out of the vehicle and then discovering that the window is not fully closed, all that is required to fully close the window is to momentarily depress button 32, to its position illustrated in Fig. 1, with door 1 in an open position whereupon rod 20 is released to move to its extended position illustrated in Fig. 1 under the urging of spring 25. Then, upon closing the door, rod 20 will engage hinge pillar 18 and be pushed inwardly causing pawl 27 to engage post 29 and completely close the window pane 3. When the window pane is completely closed, stop 31 disengages pawl 27 from post 29 and spring 35 causes crank arm 38 to engage in notch 40 to automatically hold the window closing mechanism in inoperative position until button 32 is again actuated.

Accordingly, the instant invention fully accomplishes the aforesaid objects, and enables closing of the window when the power is off. While only a preferred embodiment of the instant invention has been illustrated and described herein, it will be appreciated that the invention is not necessarily limited to the details of such embodiment and it is intended that the scope of this invention be defined by the appended claims.

Having fully disclosed and completely described this invention, and its mode of operation, what is claimed as new is:

1. A vehicle window operator for closing a window member mounted in a vehicle door member for movement between open and closed positions, said door member being hinged for swinging movement between open and closed positions with respect to an adjacent vehicle body part, comprising a lifting mechanism carried by said door member, said mechanism being adapted to engage said window member and said adjacent body part and being operable when so engaged to translate a closing movement of said door member to a window member lifting movement and thereby move said window member to its closed position automatically with movement of said door member to its closed position, and selectively releasable latch means automatically operable to normally hold said lifting mechanism inoperative.

2. A vehicle window closing mechanism comprising, in combination with a door member hinged for opening and closing movement wtih respect to an adjacent vehicle body part, a window member movable in said door member between open and closed positions, and means normally holding said window member against movement toward its open position, a first part connected to said window member for movement therewith, an actuating linkage including a second part adapted to engage said first part for moving the same and means operable automatically by movement of said door member from an open position to its closed position relative to said body part to cause said second part to move said window member to its closed position, and means automatically disengaging said first and second parts when said linkage has moved said window member to its closed position.

3. A window closing mechanism comprising, in combination with a vehicle door member hinged for opening and closing movement relative to an adjacent vehicle body part, said door member having a window member movable therein between open and closed positions, a first part connected to said window member for movement therewith, an actuating linkage carried by said door member including a second part adapted to engage said first part for moving the same, a reciprocating rod member spring biased outwardly of said door member into engagement with said adjacent body part, said rod member being moved inwardly against its spring bias upon closing movement of said door member relative to said adjacent body part, and means connecting said rod member to said second part whereby such inward movement of said rod member moves said second part to move said window member toward its closed position, and selectively releasable latch means automatically operable to normally hold said actuating linkage inoperative with said rod member being held against its spring bias.

4. A vehicle window closing mechanism comprising, in combination with a door member movable between open and closed positions with respect to an adjacent vehicle body part and having a window member movable therein between open and closed positions, a shouldered part movable with said window member, a lifting mechanism operable by closing movement of said door member relative to said body part including a crank member carried by said door member, a pawl member carried by said crank member for engagement with said shouldered part, and a reciprocating rod member connected to said crank member and spring urged through said door member for engagement with said body part, said rod member being adapted to bear against said body part upon closing movement of said door member and be retracted against its spring urge by such closing movement with the closing movement of said door member being translated by said lifting mechanism to a window member closing movement, and selectively releasable latch means operable automatically upon closing of said window member by said lifting mechanism to hold said rod member in retracted position.

5. A window closing mechanism comprising, in combination with a vehicle door assembly including a door member mounted for opening and closing movement relative to an adjacent vehicle body part and having a window member movable therein between open and closed positions, a notched member movable with said window member, window lifting means including a pawl member adapted to engage said notched member and lift the same upwardly to move siad window member to its closed position, push rod means spring biased to project beyond said door member for engaging said body part when said door member is in an open position, said rod means retracting as said door member is moved toward its closed position, means connecting said push rod means to said pawl member whereby retraction of said rod means causes said pawl member to move said window member to its closed position, means automatically operable to hold said window member against opening movement, means disengaging said pawl member from said notched member automatically when said window member reaches its closed position, and selectively releasable latch means automatically engaging said rod means to normally hold the same in retracted position.

6. A vehicle window closing mechanism comprising, in combination with a vehicle door assembly including a door member mounted for opening and closing movement relative to an adjacent vehicle body part, a window member mounted in said door member for movement between open and closed positions, and a window operator including a motor selectively operable to move said window member between its open and closed positions and means automatically operable to hold said window member against movement toward its open position except by said motor, a lifting mechanism operable to engage said window member and said body part with said door member in an open position and translate closing movement of said door member into a window member closing movement, and selectively operable control means normally rendering said lifting mechanism inoperative.

7. A vehicle window operator mechanism comprising, in combination with a vehicle door member hinged for opening and closing movement relative to an adjacent vehicle body part, a window member movable in said door member between open and closed positions, an automatic first window member operator including a motor selectively operable to raise and lower said window member and means normally holding said window member against downward movement toward its open position, an auxiliary second window member operator adapted to raise said window member to its closed position automatically upon closing said door member, said auxiliary operator including a window member lifting mechanism carried by said door member and adapted to project therebeyond against said body part with said door member in an open position and translate the closing movement of said door member into a lifting movement closing said window member, and selectively releasable latch means carried by said door member and operable to lock said lifting mechanism in inoperative position automatically upon movement of said window member to its closed position by said lifting mechanism.

8. An operating mechanism for door contained windows of motor vehicles, comprising in combination with a hingedly mounted door having a slidable window, a primary operator power actuated to open and close the window including means automatically locking the window against manual opening while permitting manual closing of the window independently of the power operator, a second operator, means holding the secondary operator normally detached from the window to permit power actuation of the window, means operable when the window is in an open position to render the holding means inoperative to cause the secondary operator to engage the window whereby when operated it will close the window independently of the power operator, and means operable by the swinging of the door to actuate the secondary operator and upon closing the door to disengage the secondary operator from the window in its closed position to free the window for being power actuated independently of the secondary operator.

References Cited in the file of this patent

UNITED STATES PATENTS

| | | |
|---|---|---|
| 2,112,431 | Townsend | Mar. 29, 1938 |
| 2,514,272 | Winkelmann | July 4, 1950 |